United States Patent Office

2,830,936
Patented Apr. 15, 1958

2,830,936

11β-HYDROXYLATION OF 11-METHYLENE STEROIDS WITH DOTHICHIZA

Donald A. Kita, Jackson Heights, and Gilbert M. Shull, Huntington Station, N. Y., assignors to Chas. Pfizer & Co., Inc., Brooklyn, N. Y., a corporation of Delaware No Drawing. Application December 17, 1956
Serial No. 628,521

3 Claims. (Cl. 195—51)

This invention is concerned with a method for the oxygenation of certain steroid compounds by means of selected cultures of microorganisms. In particular, it is concerned with the introduction of an hydroxyl group at the 11-position of the steroid nucleus in the β-configuration. A particularly useful reaction which may be accomplished with the present process is the conversion of compound S (Reichstein's Substance S or 17-hydroxy-11-desoxycorticosterone) to compound F (Kendall's Compound F or 17-hydroxycorticosterone). Any process whereby compound S may be converted to compound F in good yield and without undue expense is of tremendous value to the pharmaceutical industry and to the public in general.

This application is a continuation-in-part of copending application Serial No. 482,877, filed January 19, 1955.

Methods have previously been reported for converting compound S to compound F by means of organisms entirely different from those described below for use in the present process. In U. S. Patent 2,658,023, the use of microorganisms of the genus Curvularia is described. In U. S. Patent 2,602,769 there is described the use Cunninghamella blakesleena (of the order Mucorales) and in a publication appearing in the Journal of the American Chemical Society (vol. 74, p. 2381 (1952) a process utilizing Streptomyces fradiae is described. A great number of microorganisms have been tested for their effectiveness in converting compound S to compound F. Most of these gave no indication of such 11β-hydroxylation. A considerable number of cultures of organisms of the order Mucorales have been tested for the same reaction, and few of these showed even a low order of conversion.

It has been found that by contacting a steroid compound, in particular those having a methylene group at the 11-position, with the oxygenating activity of certain selected microorganisms, i. e. with the organisms themselves, for example under conditions of submerged, aerated fermentation, or with enzyme systems of the organisms, the selective 11β-hydroxylation of these steroid compounds may be accomplished. Among other reactions which may be accomplished is the conversion of compound S to compound F. The organisms with which we are concerned are oxygenating strains of fungi from the genus Dothichiza, which belongs to the class Fungi Imperfecti and the order Sphaeropsidales. A specimen of Dothichiza isolated from the soil, a living culture of which was deposited with the American Type Culture Collection, Washington, D. C., and given Number 11,918, is particularly suitable for carrying out 11β-hydroxylation.

The fungus ATCC 11,918 grows moderately fast on potato-dextrose agar at 28° C. A wide band of fluffy, white aerial mycelium surrounds the appressed, darker, older portion. The reverse is whitish on the edge but dark in the center like the surface. Pycnidia are numerous, crowded, nearly black, approximately round when viewed from above, measuring 115–220 x 85–130μ on potato-dextrose agar, splitting irregularly, non-ostiolate; on surface of agar or buried, attached firmly to hyphae. Spores are hyaline, one-called, smooth, elliptical to broadly elliptical, sometimes narrowed at one end, 7.2–11 x 2.6–4μ.

By means of Clement's and Shear's The Genera of Fungi the culture ATCC 11,918 was identified as a Dothichiza. Of the species described in this genus our fungus agrees best with the description of D. ferruginosa Sacc. as given in Saccardo's Sylloge Funguorum, vol. III, p. 672, 1884.

Comparison of this culture with the description supplied by Saccardo is not completely satisfactory because Saccardo's description is based upon his study of specimens found in nature, and it is well-known that some fungi will not look the same in cultivation in the laboratory as they do when found in the field. Apparently the degree of variation of species of Dothichiza in this regard has not been studied, so identification must be somewhat tentative.

The pycnidia of D. ferruginosa are described by Saccardo as being substipitate; the pycnidia of the culture ATCC 11,918 are firmly attached to the hyphae in the agar and might be considered to be pycnidia that would be substipitate in the field. The spores of D. ferruginosa are described by Saccardo as ". . . ovate-oblong, continuous, hyaline, 8 x 4μ"; those of the culture are ". . . elliptical to broadly elliptical, sometimes narrowed at one end, one-celled (continuous), 7.2–11.2 x 2.6–4μ." This apparent difference in spore shape may be due to the difference in media and other environmental conditions. We conclude, therefore, that culture ATCC 11,918 should be classified as Dothichiza ferruginosa.

As indicated above, the process of the present invention may be used for the conversion of compound S to compound F. However, the process may also be used for the 11β-oxygenation of a variety of other steroid compounds which are unsubstituted in the 11-position of the nucleus. Various side chains may be present at the 17-position of the nucleus and keto, hydroxyl group or ester group may be present at the 3-position of the nucleus. The steroid compounds used as substrates for the reaction may also bear carbon to carbon double bonds at various points of the nucleus, for example the 1, 4, 5, 6, 14 or 16 positions. Among the groups which may be present at the 17-position are COOH, alkyl, alkylene and keto. In general best results are obtained with steroids having from 18 to 21 carbon atoms in the skeleton. It should be realized that yield of oxygenated product will vary to some extent with the nature of the steroid compound used as starting material, with the particular strain of Dothichiza used, and with the conditions employed for the reaction (i. e. temperature, time, pH, nutrient medium, time at which the compound is added to the microorganism, etc.). Furthermore, a given oxygenating microorganism of the preferred species may show appreciable variation in its effect upon various steroid compounds, that is, a good yield of the corresponding 11β-oxygenated derivative may be obtained with the use of a given oxygenating strain and a specific steroid compound, whereas a second steroid compound used under otherwise exactly identical conditions may give only a moderate or poor yield of the desired compound. The presence of an hydroxyl group at the 21-position of the pregnene-type steroid structure may be particularly useful in assuring a good yield of the 11β-hydroxy compound. Since the cortical steroid type compounds possess such an hydroxyl group, the present process is particularly useful for preparing the 11β-hydroxylated compounds of this series. Among the products which have been converted to the corresponding 11β-hydroxylated products are compound S and desoxycorticosterone.

The effectiveness of a chosen microorganism for the process of this invention may be determined by cultivating the organism in a suitable nutrient medium containing carbohydrates, salts, sources of organic nitrogen and so forth. The steroid compound as a solid or as solution in a suitable solvent, for example, acetone or ethanol, is added to the cultivated microorganism under sterile conditions and the mixture is agitated and aerated in order to bring about the growth of the microorganism and oxygenation of the steroid substrate. The steroid may be added when the medium is seeded under sterile conditions with a culture of the microorganism or after growth of the organism is established. In some cases it may be found advisable to add the steroid compound after growth of the microorganism has been established in the nutrient medium under aerobic conditions. This particularly true if, during the initial stages of growth of the microorganism, there is a tendency to produce undesired by-products from the steroid substrate. The acetate or other ester of a steroid may be used in place of the alcohol itself, although this group is largely hydrolyzed off during the reaction and this may sometimes lead to an appreciably lowered yield of hydroxylated product. Alternatively, enzyme preparations from the growth of a suitable oxygenating organism of the genus Dothichiza may be used for conducting the process. A further, most useful method is one in which the microorganism is grown on a suitable nutrient medium under aerobic conditions in the absence of the steroid. The mycelial growth may then be filtered from the broth and may, if desired, be washed with distilled water. The mycelium is then suspended in distilled water containing the steroid substrate. Agitation of the mixture and aeration is continued for a period of from about 12 to 48 hours after which the products of the reaction are recovered. This process has the advantage of ease of recovery of the steroid compound, since the various nutrient material originally used to obtain growth of the microorganism are now absent as well as the various materials excreted by the growing organisms during the initial period.

In general a concentration of not greater than one to two percent by weight of the total weight of substrate, for instance, the compound S-type material, is used in conducting this process, although sometimes other concentrations may be found to be more favorably used. Since the solubility of the starting material in water is quite limited, an excess of the material may be slowly converted to the oxygenated product. However, the state of subdivision of the steroid when added to the oxygenating system, i. e. growing microorganism or enzyme system, does not seem to greatly affect the yield and nature of the products under otherwise identical conditions. If a water-miscible solvent solution of the steroid compound is added to the aqueous fermentation system, the steroid is generally precipitated in finely divided form in the presence of a large excess of water. This does not seem to appreciably improve the rate of reaction as compared to the addition of dry, relatively large crystals of the steroid.

After completion of the oxygenation process, the product may be recovered from the mixture by extraction with a suitable water-immiscible solvent. Chlorinated lower hydrocarbons, ketones, and alcohols are useful. These include chloroform, methylene chloride, trichlorethane, ethylene dichloride, and so forth. The use of hot ethylene dichloride, i. e. from about 40° to about 80° C., is particularly favored for the extraction of the steroid products. The extract of product and unreacted starting material may be concentrated to a small volume or to dryness to obtain a solid product. Purification of the product may be accomplished in several ways. Most useful is the separation by means of chromatography of the product from starting material and from other products. Adsorbents such as silica gel or other suitable adsorbents are particularly useful for this purpose.

The particular advantage which Dothichiza ferruginosa has for use in conversion of compound S to compound F lies in the fact that the product obtained is more readily purified than is the case with other oxygenating microorganisms. The organism Dothichiza ferruginosa is grown readily on relatively simple and economical media. The reaction proceeds in feasible yield within reasonable time.

The following examples are given by way of illustration and are not intended as a limitation of this invention, as many apparently widely different embodiments of the present invention may be made without departing from the spirit and scope thereof.

*Example I*

A culture of Dothichiza ferruginosa (ATCC 11,918) was propagated on an agar nutrient medium. The organism was rinsed from the agar slant under sterile conditions into a sterile medium having the following composition:

| | Percent |
|---|---|
| Malt extract | 5 |
| Sucrose | 1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |

Distilled water, adjusted to pH 7.0 with potassium hydroxide.

One hundred milliliters of this medium was used in each of several three hundred-milliliter flasks. After 72 hours, 50 ml. of compound S dissolved in propylene glycol was added. Throughout these operations the fermentation mixture was maintained under sterile conditions. The mixture was shaken for a period of 48 hours at a temperature of about 28° C. The contents of the flasks were combined and extracted with 2 volumes of chloroform. The extract was concentrated to a volume of 10 ml. Paper chromatography demonstrated the presence of compound F in the mixture.

*Example II*

A nutrient medium was prepared which consisted of 30 grams of soybean meal per liter and 1.43 grams of $KH_2PO_4$ per liter. Two liters of this medium was placed in a 4 liter pot. Dothichiza ferruginosa (ATCC 11,918) was grown therein for 24 hours after which 0.5 gram of compound S was added. The inoculated medium was aerated at the rate of about one-half to one volume of air per volume of solution per minute at 27 to 28° C. for 24 hours. The mixture was stirred at the rate of about 1700 revolutions per minute.

The whole fermentation mixture was removed from the fermentation vessel. The mixture was extracted twice with an equal volume of ethylene dichloride. The extracts were combined and evaporated to dryness. The dry solids were dissolved in a small volume of methylene chloride and the solution was chromatographed on a silica gel column. Compound F was found in the products.

*Example III*

Dothichiza ferruginosa (ATCC 11,918) was cultivated on the medium described in Example II under aerobic conditions. One hundred grams (wet weight) of mycelium, obtained after 24 hours of growth, was filtered, washed with a small volume of distilled water, and then suspended in 2 liters of distilled water. One-half gram of compound S was added to the mixture. This preparation was stirred and aerated at the rate of one-half volume of air per volume of mixture per minute for 24 hours. The mixture was then extracted with one-half volume of chloroform three times. The combined chloroform extracts were concentrated to a small volume and the mixture of steroids separated by column chromatography on silica gel. A mixture of 97% by volume methylene chloride and 3% ethanol (95%) was used to elute the column. The eluate was collected in 50 ml. fractions. In the first 4 fractions, no steroid was found. In fractions 5 through 9, unreacted compound S was found. In fractions 10 through 21, compound S and an unidentified steroid were found. Fractions 22 through 27 contained traces of compound F. A good yield of compound F was recovered in fractions 28 through 37. The column was finally washed with methyl alcohol and 2 unidentified steroids were found.

*Example IV*

The procedure of Example III was repeated except that a variety of steroids having a methylene group at the 11-position were used instead of compound S as used in Example III. The compounds used included desoxycorticosterone, testosterone, estrone, androstenedione, progesterone and 17α-hydroxy-progesterone. In each case, the corresponding 11β-hydroxylated product was isolated.

What is claimed is:

1. A process for the 11β-hydroxylation of a steroid compound having an 11-position methylene group and containing from 18 to 21 carbon atoms in the skeleton, which comprises contacting said steroid compound with the oxygenating activity of *Dothichiza ferruginosa*.

2. A process for the preparation of compound F which comprises contacting compound S with the oxygenating activity of *Dothichiza ferruginosa*.

3. A process for the preparation of compound F which comprises contacting compound S with a suspension of mycelium obtained by growing *Dothichiza ferruginosa* in an aqueous nutrient medium under aerobic conditions.

References Cited in the file of this patent

UNITED STATES PATENTS

| | | |
|---|---|---|
| 2,602,769 | Murray | July 8, 1952 |
| 2,649,401 | Haines | Aug. 18, 1953 |